(12) United States Patent
Ozawa

(10) Patent No.: US 6,392,622 B1
(45) Date of Patent: May 21, 2002

(54) ACTIVE-MATRIX SUBSTRATE, ELECTRO-OPTICAL DEVICE, METHOD FOR MANUFACTURING ACTIVE-MATRIX SUBSTRATE, AND ELECTRONIC EQUIPMENT

(75) Inventor: Tokuroh Ozawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/402,802

(22) PCT Filed: Feb. 16, 1999

(86) PCT No.: PCT/JP99/00678

§ 371 Date: Oct. 12, 1999

§ 102(e) Date: Oct. 12, 1999

(87) PCT Pub. No.: WO99/42897

PCT Pub. Date: Aug. 26, 1999

(30) Foreign Application Priority Data

Feb. 19, 1998 (JP) .......................................... 10-037755

(51) Int. Cl.[7] ................................................ G09G 3/36
(52) U.S. Cl. .......................................... 345/92; 349/40
(58) Field of Search .......................... 345/92, 204–206, 345/80, 87; 349/149–152, 40; 257/59, 259

(56) References Cited

U.S. PATENT DOCUMENTS 4,803,536 A * 2/1989 Tuan ............................ 257/61
5,068,748 A * 11/1991 Ukai et al. ..................... 349/40
5,668,032 A * 9/1997 Holmberg et al. ........... 438/149
5,926,234 A * 7/1999 Shiraki et al. ................. 349/40
6,157,066 A * 12/2000 Kobayashi ................... 257/363

FOREIGN PATENT DOCUMENTS

| JP | 62-252964 | 11/1987 |
| JP | 62-291688 | 12/1987 |
| JP | 3-296725 | 12/1991 |
| JP | 6-332011 | 12/1994 |
| JP | 7-318966 | 12/1995 |
| JP | 8-116063 | 5/1996 |

* cited by examiner

Primary Examiner—Richard Hjerpe
Assistant Examiner—Alexander Eisen
(74) Attorney, Agent, or Firm—Oliff & Berridge, PLC

(57) ABSTRACT

In an active-matrix substrate, an electro-optical device, and a method for manufacturing an active-matrix substrate, to effectively prevent TFTs and other devices formed on a substrate from being destroyed by static electricity generated in a rubbing process for an alignment film or the like, a pixel section in which each pixel electrode is formed in a matrix, a data-line driving circuit, a scanning-line driving circuit, and an external-connection terminal are formed in each panel area of a large substrate and an antistatic common wiring is made from a conductive layer, when the active-matrix substrate is manufactured. This common wiring is formed so as to cross over the boundary of adjacent panel areas and collects static electricity generated when the rubbing process is applied to the large substrate, and the charges are dispersed. Although TFTs made in the low-temperature process are weak against electrostatic destruction, the common wiring protects the TFTs from electrostatic destruction.

24 Claims, 9 Drawing Sheets

Fig. 4A  Fig. 4B

ACTIVE-MATRIX SUBSTRATE, ELECTRO-OPTICAL DEVICE, METHOD FOR MANUFACTURING ACTIVE-MATRIX SUBSTRATE, AND ELECTRONIC EQUIPMENT

BACKGROUND OF THE INVENTION

1. Field of the Invention

The present invention relates to active-matrix substrates, electro-optical devices, methods for manufacturing active-matrix substrates, and electronic equipment. More specifically, it relates to an electrostatic-destruction prevention technology suited to manufacturing of an active-matrix substrate of a type in which pixel electrodes are driven by poly-silicon thin-film transistors (thin film transistor is hereinafter referred to as TFT) formed on an insulating substrate.

2. Background of the Related Art

Among various liquid crystal panels, an active-matrix liquid crystal panel is formed, for example, by sequentially and selectively forming a semiconductor layer, an insulating layer, and a conductive layer on a large substrate, such as a glass substrate, to form a plurality of panel areas provided with active elements, passive elements, electrodes, and other components, and by cutting these panel areas from the large substrate. This active-matrix substrate is used for an electro-optical device. Specifically, it is used in an electro-optical device in which a liquid crystal is sandwiched by the active-matrix substrate and an opposing substrate. In the active-matrix substrate, a number of pixels are formed in a matrix and they form a pixel section. In the pixel section, thin-film transistors (TFTs) are formed and a voltage is applied to pixel electrodes through the TFTs.

In such an active matrix substrate, when poly-silicon (Poly-Si) is used as a semiconductor material to form the TFTs, since transistors and other devices constituting peripheral circuits such as a shift register and a driving circuit can be formed in the same process, high integration is enabled.

In such an active matrix substrate, when poly-silicon TFTs are formed as transistors, since the active-matrix substrate can be formed in a low-temperature process, it is advantageous that a glass substrate made from silica glass or non-alkaline glass can be used as an insulating substrate.

Since the glass substrate is likely to be charged, however, when static electricity is discharged from the charged substrate, TFTs and other devices working as active elements may be destroyed (hereinafter called electrostatic destruction) by static electricity.

In an active-matrix substrate, an alignment layer is formed on the glass substrate on which active elements, passive elements, and electrodes are formed, to align liquid-crystal molecules in a prescribed direction. In a rubbing process for the alignment layer, however, the substrate is charged with high-voltage static electricity generated by the rubbing. When static electricity is discharged from the charged substrate, the TFTs and other devices working as active elements may be electrostatically destroyed.

More specifically, an organic high-polymer film made from polyimide resin or the like is formed on the glass substrate on which the active elements and other devices are formed, and the rubbing process is applied to a surface of this resin film to align the liquid-crystal molecules, in which the surface is rubbed with textile fabrics made from fiber, such as rayon and nylon, in a constant direction at a prescribed load. In this process, friction between the resin film and the fiber generates high-voltage static electricity. This static electricity charges the substrate itself, or is discharged over insulation to electrostatically destroy semiconductor devices, such as the TFTs formed on the substrate.

SUMMARY OF THE INVENTION

According to knowledge which the inventors of the present application obtained, since poly-silicon TFTs and other devices formed in the low-temperature process at a maximum process temperature of about 400 to 600° C. have an extremely low dielectric strength, they are likely to be electrostatically destroyed. In some cases, they may cause a serious problem almost identical to a fatal error, in which the entire driving circuit does not function.

Accordingly, an object of the present invention is to provide an active-matrix substrate, an electro-optical device, and a method for manufacturing an active-matrix substrate, which provide a structure that can effectively prevent TFTs and other devices formed on a substrate from being destroyed by static electricity generated for some reason or by a rubbing process for a liquid-crystal alignment layer.

To achieve the foregoing object, according to the present invention, an active-matrix substrate, on which are formed a pixel section provided with a pixel electrode and a switching element connected to the pixel electrode, a peripheral circuit disposed around the pixel section that controls the switching element, and an external-connection terminal electrically connected to the peripheral circuit, is characterized in that an antistatic conductive layer is formed at least at a part of the area on the substrate excluding the pixel section.

In the present invention, the antistatic conductive layer collects static electricity generated when a rubbing process is applied to a polyimide film formed on the active matrix substrate or the like to change it to a liquid crystal alignment layer, and the charges are dispersed. Therefore, the substrate itself is prevented from being charged. Active elements and other elements formed in the peripheral circuit and other circuits are prevented from being electrostatically destroyed during discharging. Therefore, TFTs formed in a low-temperature process, which are not immune to static electricity, can be used as active elements. In addition, since the antistatic conductive layer serves as a large-capacitance bypass capacitor ("pass cap") when an electro-optical device is operated, it contributes to providing lower noise and lower EMI. Therefore, higher image quality and higher resolution are implemented in the electro-optical device.

In the present invention, it is preferred that the antistatic conductive layer be formed in the area on the substrate excluding the pixel section, only at the upper layer sides of a no-wiring section, where wiring is not formed, of an area where wiring is formed to which a DC voltage is applied, and of an area where wiring is formed to which a DC voltage is applied when an image is displayed. With this configuration, even when an antistatic conductive layer is formed, the capacitive load of the driving circuit does not increase. Therefore, since a signal transmitted through the wiring is not delayed, transistors are prevented from being electrostatically destroyed while enabling a high-speed operation.

In the present invention, it is preferred that the antistatic conductive layer be formed such that it is exposed on a surface of the substrate. With this configuration, the antistatic conductive layer positively collects static electricity generated in the rubbing process to disperse it. Therefore, the substrate itself is prevented from being charged, and active elements and other elements are prevented from being electrostatically destroyed during discharging.

In the present invention, it is preferred that the antistatic conductive layer be formed at least at the outer peripheral edge of the substrate. In other words, it is preferred that, after the pixel section, the peripheral circuit, the terminal section, and the antistatic conductive layer are formed in each of a plurality of panel areas, each of which is cut from a large substrate as the active-matrix substrate, the antistatic conductive layer be formed so as to cross over the boundary of adjacent panel areas. With this configuration, since a potential difference between panel areas is eliminated and the same potential plane can be extended, problems caused by static electricity are more positively prevented from occurring.

In the present invention, it is preferred that external-connection terminals be electrically connected through an electrostatic protection circuit in which two sets of diode chains are disposed in reverse directions to each other. It is also preferred that each external-connection terminal and the antistatic conductive layer be connected with an electrostatic protection circuit in which two sets of diode chains are disposed in reverse directions to each other. With this configuration, when the potential of static electricity accumulated on the external-connection terminals exceeds a prescribed value, the static electricity is released through the electrostatic protection circuits to the antistatic conductive layer. Therefore, discharging is prevented from occurring between external-connection terminals and between an external-connection terminal and the antistatic conductive layer.

In the present invention, the switching device and the peripheral circuit may be formed of thin-film transistors. In this case, it is preferred that the channel lengths of diode-connection thin-film transistors constituting the diode chains in the electrostatic protection circuit be longer than the channel lengths of the thin-film transistor connected to the pixel and the thin-film transistors formed in the peripheral circuit. With this configuration, since deterioration of the diode chains used for the electrostatic protection circuit is suppressed, the life of the electro-optical device is extended.

In the present invention, it is preferred that the active-matrix substrate be configured such that the thin-film transistors are connected to a scanning line and a data line; the peripheral circuit includes a data-line driving circuit that outputs to the data line at least an image signal to be applied to the pixel electrode through the thin-film transistor and a scanning-line driving circuit that outputs a scanning signal to control selection/non-selection states of the thin-film transistors to the scanning line; and the plurality of diode-connection external-connection terminals include an external-connection terminal electrically connected to the data-line driving circuit and an external-connection terminal electrically connected to the scanning-line driving circuit. With this configuration, since a potential difference is prevented from being generated between the data-line driving circuit and the scanning-line driving circuit, electrostatic destruction is positively prevented from occurring in an imbalanced manner in either side of the data-line driving circuit or the scanning-line driving circuit.

In the present invention, it is preferred that the antistatic conductive layer is made from the same material as the pixel electrode or the external-connection terminals. It is preferred, for example, that the antistatic conductive layer is made from Al (aluminum), Ti (titanium), Ta (tantalum), Cr (chromium), or an alloy thereof. The antistatic conductive layer may be formed of a transparent conductive film made from an indium tin oxide film (ITO film). With this configuration, since the antistatic conductive layer can be formed at the same time as the pixel electrode or the external-connection terminals, the manufacturing process is simplified. When the antistatic conductive layer is formed of an indium tin oxide film serving as a transparent conductive film, since ITO has a higher resistivity coefficient than other metal materials, instantaneous discharging is received by a circuit network having a longer time constant compared with a case in which the antistatic conductive layer is made from a metal material having almost the same film thickness. Therefore, an instantaneous voltage applied to the wiring during discharging is reduced.

The present invention is effective when the active areas of the thin-film transistors are formed of a poly-silicon film.

An active-matrix substrate according to the present invention is used to form an electro-optical device together with an opposing substrate which opposes the active-matrix substrate with a prescribed gap, and an electro-optical material such as liquid crystal sealed in the gap between the opposing substrate and the active-matrix substrate.

In a method for manufacturing an active-matrix substrate according to the present invention, for example, after the pixel section, the peripheral circuit, the terminal section, and the antistatic conductive layer are formed in each of a plurality of panel areas, each of which is to be cut from a large substrate as the active-matrix substrate, the plurality of panel areas are cut from the large substrate to make the active-matrix substrates.

In this case, it is preferred that the antistatic conductive layer is formed so as to cross over the boundary of adjacent panel areas.

An electronic equipment according to the present invention is characterized in that an electro-optical device is mounted as a display device. An electronic equipment is also characterized in that an electro-optical device is mounted as a light valve.

DETAILED DESCRIPTION OF THE PREFERRED EMBODIMENTS

Figure 1:
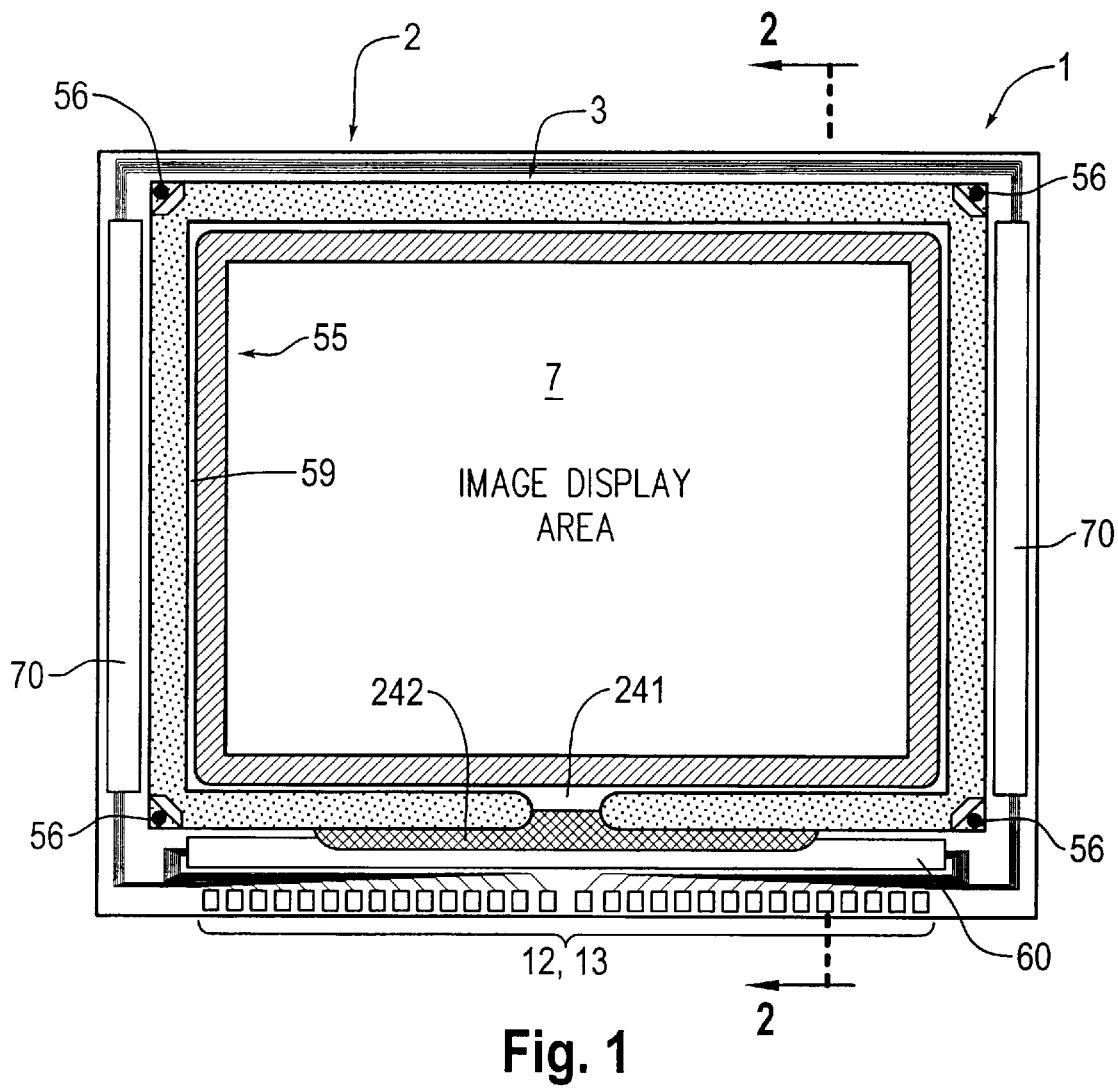
FIG. 1 is a plan of a liquid-crystal panel used for an electro-optical device to which the present invention is applied, viewed from the opposing-substrate side.

Preferred embodiments of the present invention will be described below by referring to the drawings.

(Structure of an active-matrix substrate)

Figure 2:
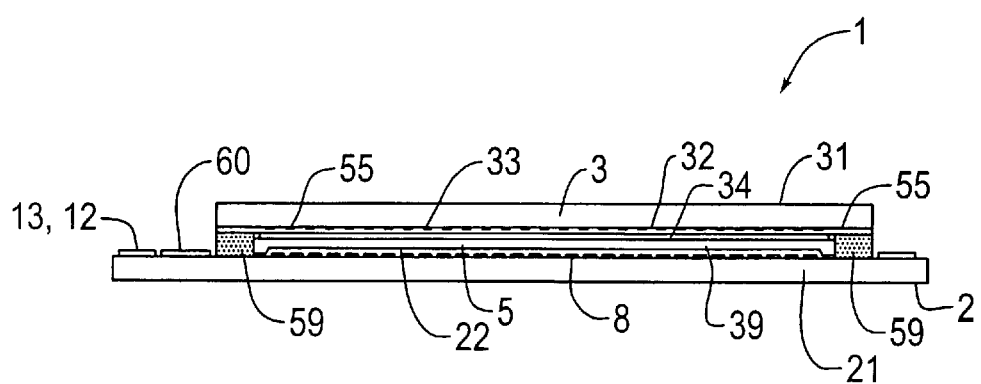
FIG. 2 is a cross-sectional view of the liquid-crystal panel taken on line H–H' shown in FIG. 1.
Figure 3:
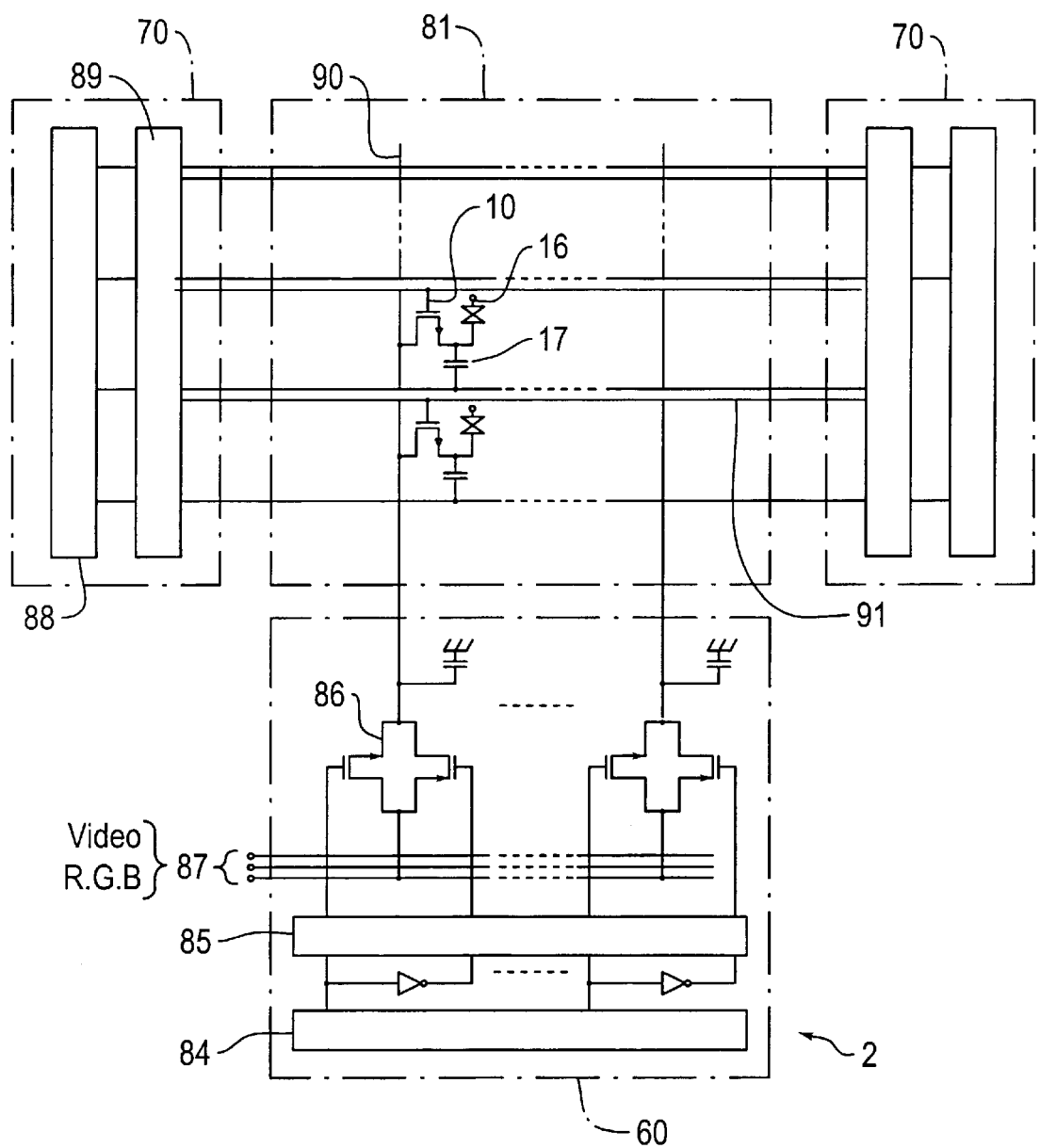
FIG. 3 is a block diagram showing a typical structure of an active-matrix substrate shown in FIG. 1.

FIG. 1 and FIG. 2 are a plan view of a liquid-crystal panel used for an electro-optical device to which the present invention is applied, viewed from the opposing-substrate side, and a cross-sectional view of the liquid-crystal panel taken on line H–H' shown in FIG. 1, respectively. FIG. 3 is a block diagram showing a typical structure of an active-matrix substrate.

In FIG. 1 and FIG. 2, a liquid-crystal panel 1 is formed of an active-matrix substrate 2, an opposing substrate 3 on which opposing electrodes 32 are formed, and a liquid crystal 39 (electro-optical material) sandwiched between these substrates.

In the active-matrix substrate 2, pixel electrodes 8 are formed in a matrix on a surface (surface closer to the liquid-crystal layer) of an insulating substrate 21 (glass substrate). In each pixel electrode 8, a thin-film transistor (hereinafter called a TFT, see FIG. 3) for pixel switching is formed. An alignment layer 22 is formed on the front surface of the pixel electrodes 8. This alignment layer 22 is formed by applying a rubbing process to a layer made from polyimide resin or the like. In the opposing substrate 3, a light-shielding film 33 called a black matrix is formed on a surface of an insulating substrate 31 (glass substrate) such that it opposes the boundary areas of the pixel electrodes 8 of the active-matrix substrate 2, and the opposing electrodes 32 and an alignment layer 34 are formed on the front surface of the light-shielding film 33. This alignment layer 34 is also formed by applying the rubbing process to a layer made from polyimide resin or the like.

The active-matrix substrate 2 and the opposing substrate 3 configured as described above are pasted together with a prescribed gap placed therebetween by a sealing material 59 including a gap material, applied to the active-matrix substrate 2 or the opposing substrate 3. In this condition, the sealing material 59 forms a liquid-crystal sealing area 5 between the active-matrix substrate 2 and the opposing substrate 3, and the liquid crystal 39 is sealed into the liquid-crystal sealing area 5. As the sealing material 59, epoxy resin or various ultraviolet-curing resins can be used. As the gap material combined with the sealing material 59, inorganic or organic fiber or spheres of about 2 $\mu$m to about 10 $\mu$m is used. The sealing material 59 has a partial opening, which forms a liquid-crystal inlet 241. Therefore, after the opposing substrate 3 and the active-matrix substrate 2 are pasted together, when the area inside the sealing material 59 is set to a lower-pressure state, the liquid crystal 39 is poured into from the liquid-crystal inlet 241 (FIG. 1). After the liquid crystal 39 is sealed, it is only necessary to close the liquid-crystal inlet 241 with a sealant 242.

The opposing substrate 3 is smaller than the active-matrix substrate 2. They are pasted together in a condition in which the peripheral section of the active-matrix substrate 2 exceeds the outer peripheral edge of the opposing substrate 3. Therefore, at the outer peripheral part of the opposing substrate 3, peripheral circuits (scanning-line driving circuits 70 and a data-line scanning circuit 60) formed at the outer peripheral part of the active-matrix substrate 2 and a terminal section 12 where external-connection terminals 13 electrically connected to the peripheral circuits are exposed.

The opposing substrate 3 is provided with a light-shielding film 55 for completely forming an image display area 7 at the inside of the sealing material 59. At each corner of the opposing substrate 3, an upper-and-lower conducting material 56 is formed to establish electrical conduction between electrodes and other components formed on the active-matrix substrate 2, and electrodes and other components formed on the opposing substrate 3.

The scanning-line driving circuits 70 are formed at both sides of the image display area 7 in the liquid-crystal panel 1 configured as described above. It is needless to say that a scanning-line driving circuit 70 may be formed at one side only if a delay of a scanning signal supplied to the scanning lines causes no problem. The data-line driving circuit 60 may be placed at each side along sides of the image display area 7. The data-line driving circuits 60 may be configured such that a data-line driving circuit disposed along one side of the image display area 7 sends an image signal through odd-numbered data lines and a data-line driving circuit disposed along the opposing side of the image display area 7 sends an image signal through even-numbered data lines. When data lines are driven in a mesh manner as described above, since the area for the data-line driving circuits 60 is extended, a complicated circuit can be configured. The active-matrix substrate 2 may be provided with an inspection circuit at the opposing side of the data-line driving circuit 60 using, for example, the underneath area of the light-shielding film 55. At the surfaces of the opposing substrate 3 and the active-matrix substrate 2 where light is incident or where light is emitted, a polarizing film, at least one retardation film, and a polarizer are disposed in a prescribed direction according to the type of the liquid crystal 39 used, namely, the operation mode thereof being a TN (twisted nematic) mode, a guest-host TN mode, a multi-domain vertical alignment (MVA) mode, or other modes, and whether a normally black mode or a normally white mode is used.

When an RGB color filter (not shown) and its protection film (not shown) are formed at an area opposing the respective pixel electrodes 8 in the opposing substrate 3, a color display device such as a color liquid-crystal TV set can be configured. When the liquid-crystal panel 1 is of a transmissive type, it can be used, for example, for a projection display device (projector). In this case, since three liquid-crystal panels 1 are used as RGB light valves, and RGB color lights separated through dichroic mirrors for RGB separation are incident on the liquid-crystal panels 1 as projection lights, a color filter is not formed on the liquid-crystal panel 1. (Basic structure of the active-matrix substrate)

As shown in FIG. 3, pixel switching TFTs 10 connected to data lines 90 and scanning lines 91, and liquid-crystal cells 16 to which an image signal is input through the TFTs 10 from the data lines 90 are disposed on the active-matrix substrate 2 for the electro-optical device. An area where such pixels are formed is called a pixel section 81 which directly contributes to display. Around this pixel section 81, peripheral circuits are formed.

Specifically, at the outer periphery of the pixel section 81, a data-line driving circuit 60 (X-side driving circuit) having a shift register 84, a level shifter 85, video lines 87, and analog switches 86 is formed. This data-line driving circuit 60 outputs an image signal to the data lines 90.

At the outer periphery of the pixel section 81, scanning-line driving circuits 70 (Y-side driving circuits) each having a shift register 88 and a level shifter 89 are formed. These scanning-line driving circuits 70 output scanning signals to the scanning lines.

In the pixel section 81, a storage capacitor 17 (capacitive element) is formed between each pixel and the scanning line 91 for the preceding stage. This storage capacitor 17 increases a charge storage characteristic in the liquid-crystal cell 16. The storage capacitor 17 may be formed between the pixel and a capacitive line.

(Structure of driving circuits)

Figure 4C:
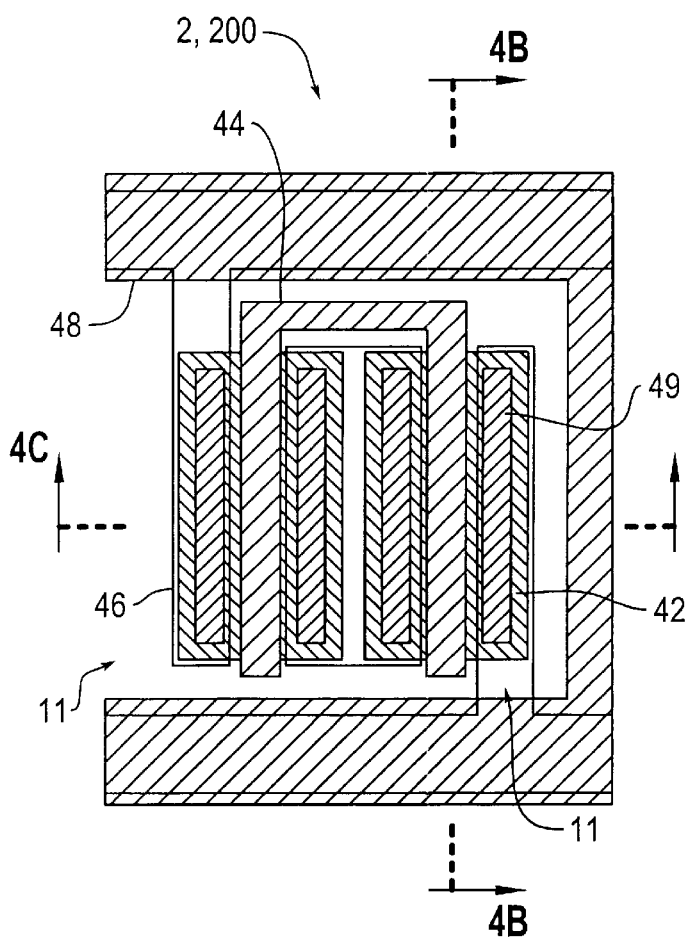
FIGS. 4(*a*), (*b*), and (*c*) are a plan view of a driving circuit of the active-matrix substrate shown in FIG. 1, a cross-sectional view taken on line A–A', and a cross-sectional view taken on line B—B', respectively.
Figure 4C:
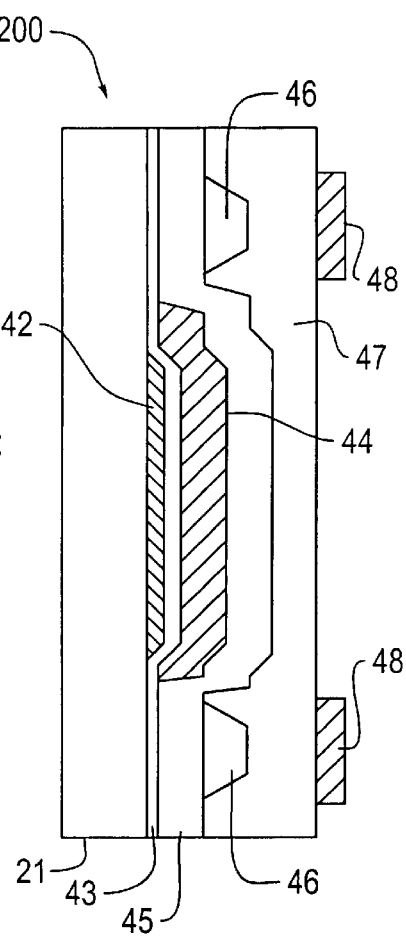
Figure 4C:
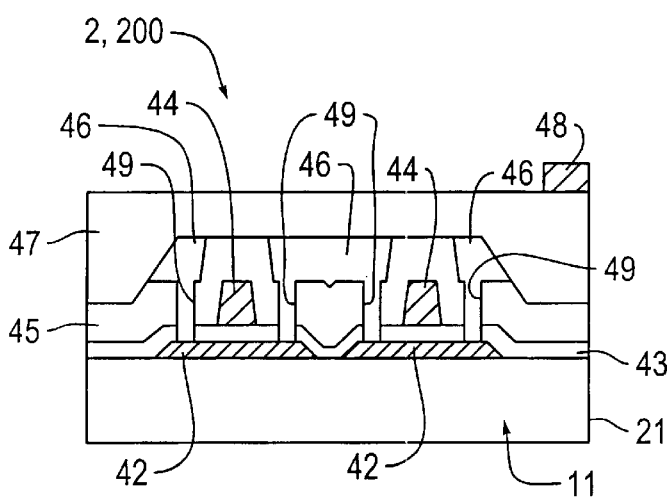

FIGS. 4(*a*)–4(*c*) are is a view showing peripheral circuits formed on the active-matrix substrate 2 to which the present invention is applied. FIG. 4(*a*) is a plan view of an inverter used in a driving circuit, FIG. 4(*b*) is a cross-sectional view taken on line A–A' shown therein, and FIG. 4(*c*) is a cross-sectional view taken on line B–B'.

The active-matrix substrate 2, which is formed in the low-temperature process, will be described below.

In FIGS. 4(*a*), (*b*), and (*c*), a poly-silicon TFT 11 constituting the peripheral circuits is formed on the insulating substrate 21. In the poly-silicon TFT 11, a semiconductor layer 42 constituting an active layer is formed of a multi-crystalline silicon (poly-silicon) film having a film thickness of 300 to 700 angstroms.

When such a multi-crystalline semiconductor layer 42 is formed, the insulating substrate 21 made from a glass substrate is prevented from thermally being deformed in the present embodiment by the use of a low-temperature process. In the low-temperature process, the maximum process temperature (maximum temperature which the whole substrate reaches at the same time) is less than about 600° C. (preferably, less than about 500° C.). Conversely in a high-temperature process, the maximum process temperature (maximum temperature which the whole substrate reaches at the same time) is not less than about 800° C. A high-temperature process at 700° C. to 1200° C. is used for film forming at a high temperature and thermal oxidation of silicon.

Since it is impossible to directly form a poly-silicon layer on a substrate in the low-temperature process, an amorphous semiconductor layer 42 is formed on the substrate with the use of a low-temperature plasma CVD method or a low-temperature, low-pressure CVD method, and then the semiconductor layer 42 is required to be crystallized. As crystallization methods, there are known an SPC method (solid phase crystallization) and an RTA method (rapid thermal annealing). When laser annealing (ELA: excimer laser) is performed by irradiating an excimer laser beam using XeCl, a rise of a substrate temperature is suppressed and multi-crystalline Si having large grain diameters is obtained.

In the crystallization process, laser light (excimer laser) emitted from a laser source is, for example, irradiated toward the insulating substrate 21 through an optical system. In this case, a line beam is irradiated on the semiconductor layer 42 to have a long illuminated area in the width direction of the substrate, and the illuminated area is shifted in the length direction of the substrate. When the area illuminated by the laser light is shifted, it is shifted by a prescribed distance such that laser illuminated areas partially overlap. As a result, the amorphous semiconductor layer 42 is melted once, and then multi-crystallized through a cooling and curing process. In this case, since the laser light is irradiated to each area for a very short time and the illuminated area is just a part of the substrate, the entire insulating substrate 21 is not heated to a high temperature at the same time. Therefore, when a glass substrate is used for the insulating substrate 21, thermal deformation or a thermal crack is not generated although the glass substrate is inferior to a quartz substrate in terms of heat resistance.

On a surface of the semiconductor layer 42 formed in this way, a gate insulating film 43 formed of a silicon oxide film, a silicon nitride film, and the like is formed. This gate insulating film 43 is also formed in the low-temperature process at a maximum process temperature of 400 to 600° C. More specifically, the gate insulating film 43 is formed at a thickness of about 600 to 1500 angstroms in a plasma CVD method with, for example, TEOS (tetraethoxysilane) or the like being used as material gas.

Gate wiring 44 formed of a metal film such as Ta (tantalum), Mo (molybdenum), Ti (titanium), W (tungsten), Cr (chromium), and Al (aluminum) is formed on the gate insulating film 43. This gate wiring 44 is formed, for example, in a sputtering method.

High-concentration impurity areas serving as a source area and a drain area against the gate wiring 44 in a self-matching manner are formed on the semiconductor layer 42 by ion implantation of impurities (for example, phosphorus or boron) with the gate wiring 44 being used as a mask. On this occasion, a portion where impurities are not introduced serves as a channel area.

At the front surface of the gate wiring 44, the first inter-layer insulating film 45 is formed. The source and drain electrodes 46 formed of a conductive film such as indium tin oxide (ITO) and Al are electrically connected to the drain areas and the source areas of the TFTs in the semiconductor layer 42 through contact holes 49 formed in the gate insulating film 43 and the first inter-layer insulating film 45. These contact holes 49 are formed, for example, by dry etching of the gate insulating film 43 and the first inter-layer insulating film 45.

A second inter-layer insulating layer 47 is formed so as to cover the first inter-layer insulating film 45 and the source and drain electrodes 46. The first inter-layer insulating film 45 and the second inter-layer insulating layer 47 are formed of a silicon oxide film formed by applying, for example, a BPSG film (a silicate glass film including boron and phosphorus) and polysilazane, and by baking. Their thickness ranges from about 3000 to 15000 angstroms. It is a matter of course that the first inter-layer insulating film 45 and the second inter-layer insulating layer 47 may be formed by the plasma CVD method with TEOS being used as material gas.

(Countermeasure 1 against static electricity)

Figure 5:
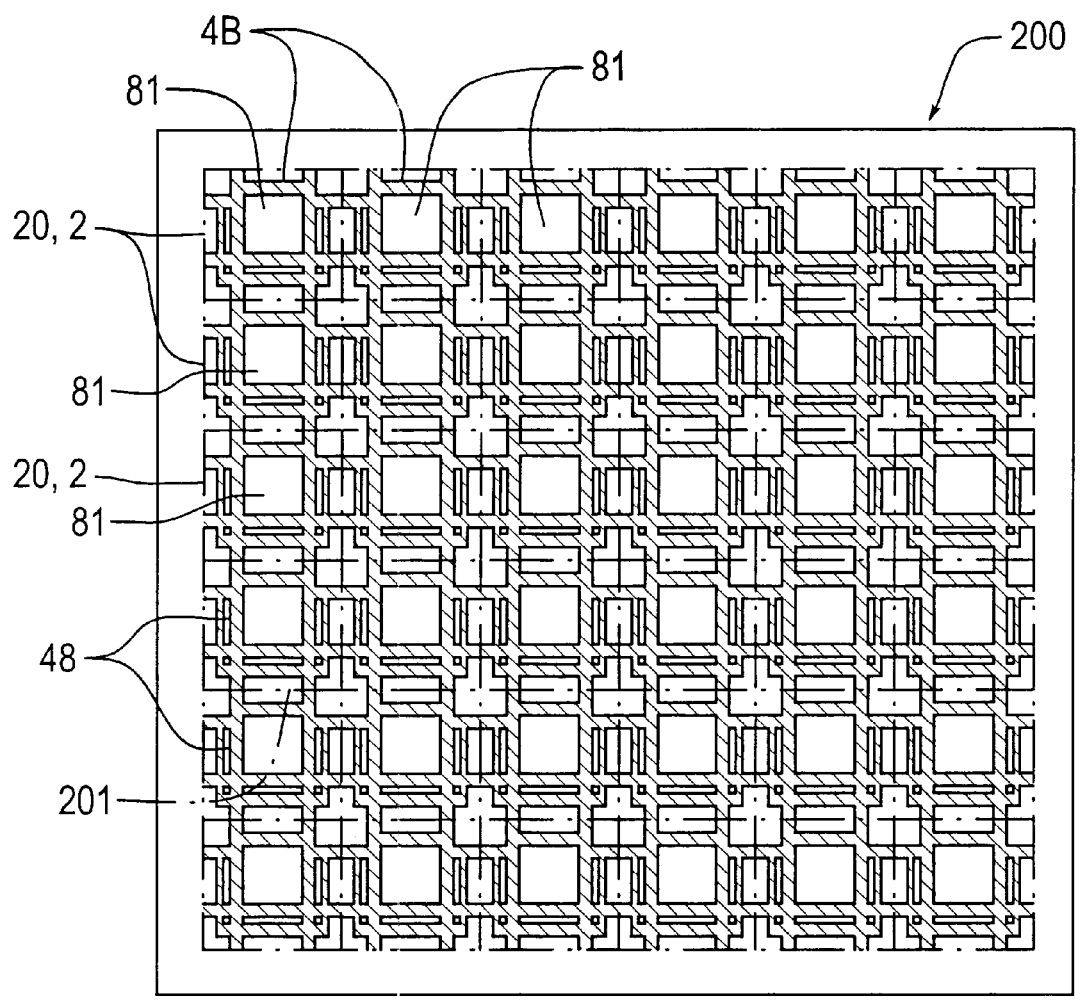
FIG. 5 is a plan view showing a forming pattern of antistatic common wiring (conductive layer) on a large substrate for manufacturing the active-matrix substrate shown in FIG. 1.
Figure 6:
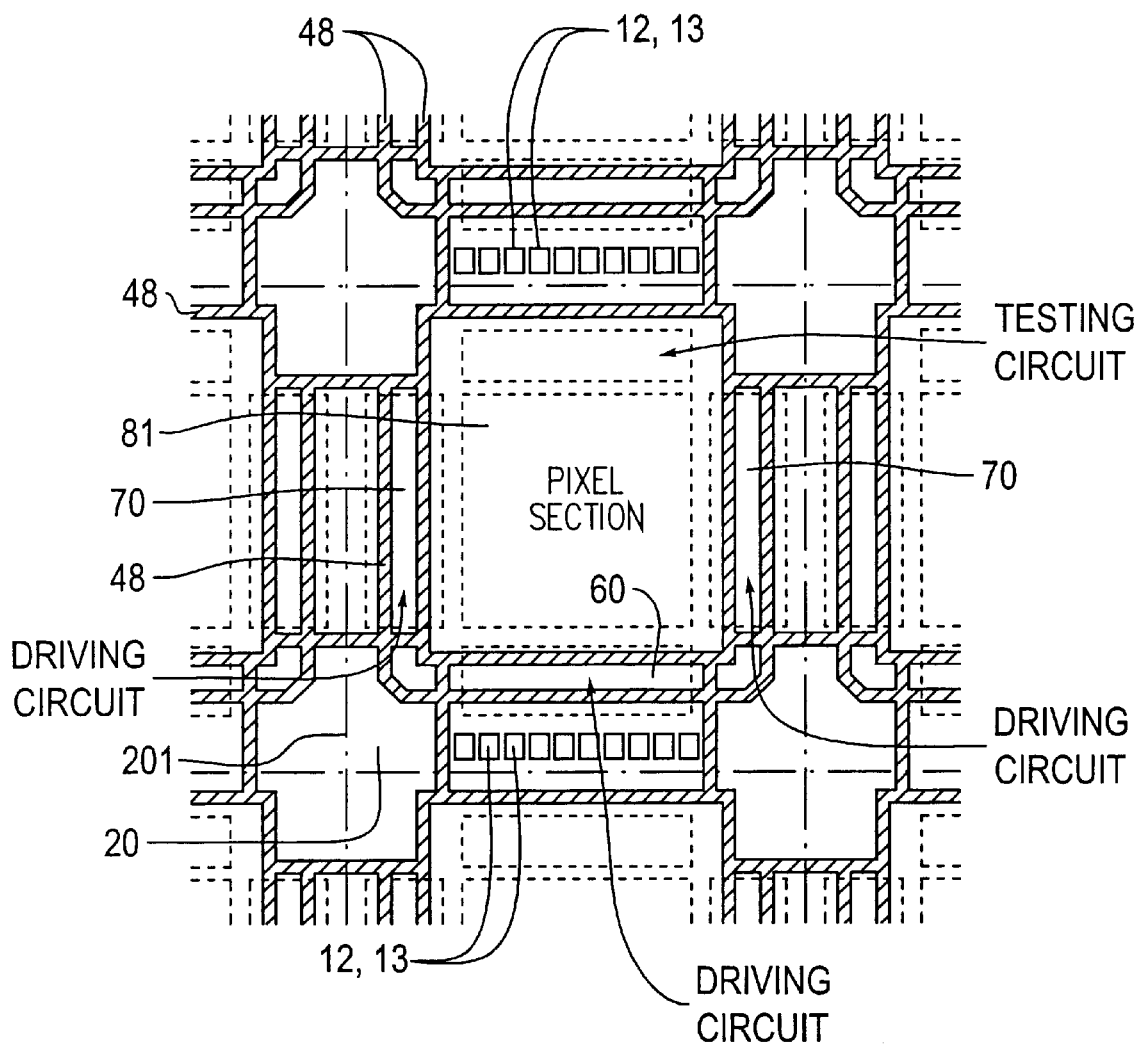
FIG. 6 is a plan view showing an enlarged part of the antistatic common wiring (conductive layer) shown in FIG. 5.

FIG. 5 is a plan view showing a forming pattern of antistatic common wiring (conductive layer) on a large substrate for manufacturing the active-matrix substrates in the present embodiment. FIG. 6 is a plan view showing an enlarged part of the antistatic common wiring (conductive layer) shown in FIG. 5.

In the active-matrix substrate 2 configured as described above, at positions on a surface of the second inter-layer insulating layer 47, which are located directly above the source and drain electrodes 46, antistatic common wiring 48 (antistatic conductive layer) configured by referring to FIG. 5 and FIG. 6 is formed. This common wiring 48 is formed of a conductive film formed of an ITO film, Al, Ti, Ta, Cr, or an alloy thereof. Even if the common wiring 48 is made from any of the above materials, it is formed in the same process as the pixel electrodes 8 and the external-connection terminals 13.

The common wiring 48 is exposed at the surface of the active-matrix substrate 2. On a surface of the common wiring 48, no insulating film or anything else is formed (see FIG. 4).

The antistatic common wiring 48 is formed only on the upper layer sides of a no-wiring section where wiring is not formed, of an area where wiring is formed to which a DC voltage is applied, and of an area where wiring is formed to which a DC voltage is applied when an image is displayed, among the areas on the insulating substrate 21, excluding the pixel section 81.

The active-matrix substrate 2 configured as described above is manufactured by forming each component in a large substrate from which a number of the active-matrix substrates 2 are obtained and by dividing the large substrate.

More specifically, as shown in FIG. 5 and FIG. 6, a number of areas from which the active-matrix substrates 2 are obtained are formed as panel areas 20 arranged in the horizontal and vertical directions on a large substrate 200. When the large substrate 200 is cut along planned cutting lines 201, each panel area 20 serves as each active-matrix substrate 2.

When each component is formed in such a large substrate 200, the common wiring is formed such that it is short-circuited among the respective panel areas 20. More specifically, the common wiring 48 is formed in each panel area 20 on the surface of the large substrate 200 so as to enclose the pixel section 81 disposed almost at the center of each panel area 20. Between adjacent panel areas 20, the common wiring 48 in one area is connected to that in the other area. Therefore, the common wiring 48 is connected to each other in adjacent panel areas 20, and the whole common wiring 48 produces a large closed circuit exposed on the substrate surface. Consequently, the whole common wiring 48 has a much larger capacitance than the gate wiring 44 and the source and drain electrodes 46.

As described above, in the present embodiment, since an extremely large capacitance is obtained by the common wiring 48 formed on the large substrate 200, when a rubbing process is executed for the large substrate 200, the entire common wiring 48 can accumulate high-voltage static electricity generated during the rubbing process to disperse charges. Since the common wiring 48 is formed so as to cross over the boundary of each panel 20, a potential difference between respective panel areas 20 is almost eliminated and the same potential plane can be extended to the entire large substrate 200. Therefore, the common wiring 48 positively prevents discharging between respective panel areas 20 and effectively prevents electrostatic destruction of TFTs and other devices.

In other words, high-voltage static electricity generated by friction between the resin film (alignment film) and the fiber (textile fabrics) during the rubbing process for the large substrate 200 all goes to and is dispersed on the common wiring 48, which is exposed on the surface of the large substrate 200, and the textile fabrics and the common wiring 48 have the same potential. Therefore, a potential difference is effectively prevented from being generated among an active-element section such as TFTs formed on the large substrate 200, other passive-element sections, wiring sections, and electrode sections. In addition, TFTs and other devices are prevented from being electrostatically destroyed during discharging or for some other reason.

The inventors of the present application have found that, since the gate insulating film 43 for poly-silicon TFTs, made in the low-temperature process at a maximum process temperature of 400 to 600° C., has an extremely low dielectric strength, unlike that made in the high-temperature process in which a gate insulating film is made with the use of thermal oxidation at about 1000° C., the gate insulating film 43 tends to be electrostatically destroyed. Therefore, as in the present embodiment, when the common wiring 48 is exposed at the surface of the large substrate 200, even if static electricity is generated in a rubbing process, the static electricity can be positively accumulated in the entire common wiring 48 to disperse charges. Consequently, although TFTs made in the low-temperature process tend to be weak against electrostatic destruction, the common wiring 48 positively protects the TFTs from static electricity caused by the rubbing process.

Since the antistatic common wiring 48 is formed only on the upper layer sides of the no-wiring section where wiring is not formed, of the area where wiring is formed to which a DC voltage is applied, and of the area where wiring is formed to which a DC voltage is applied when an image is displayed, among the areas on the insulating substrate 21, excluding the pixel section 81, when the antistatic common wiring 48 is formed, the capacitive load of the driving circuits does not increase. Therefore, since a signal transmitted through the wiring is not delayed, transistors are prevented from being electrostatically destroyed while a high-speed operation is allowed.

In addition, when being divided into the active-matrix substrates 2 and used for an electro-optical device, the common wiring 48 serves as a bypass capacitor ("pass cap") having a large capacitance when driven. Therefore, an electro-optical device using the active-matrix substrate has a lower noise and a lower EMI, and a malfunction of a driving circuit and other circuits formed on the same substrate is eliminated.

(Countermeasure 2 against static electricity)

Figure 7:
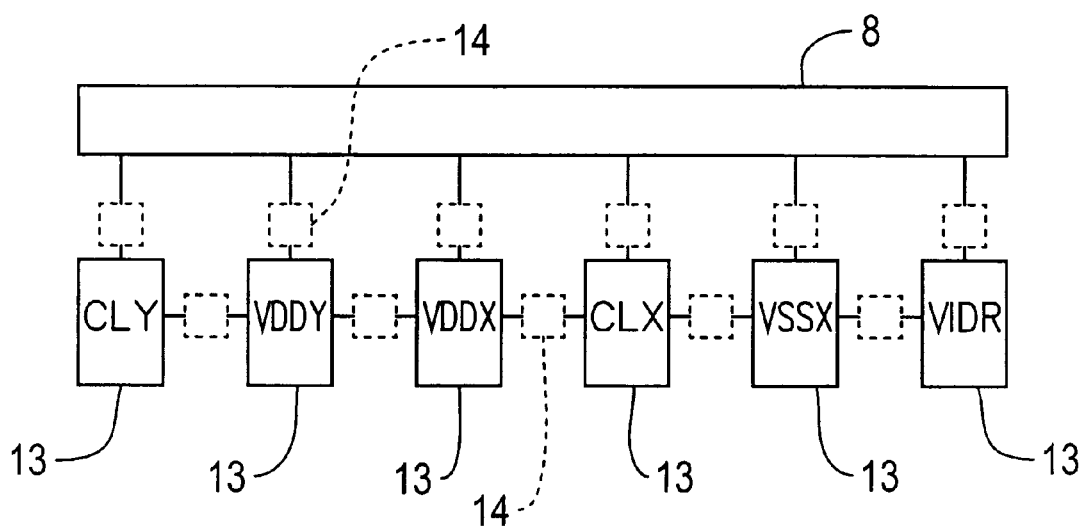
FIG. 7 is a block diagram showing an example of a connection of an antistatic conductive layer, external-connection terminals, and electrostatic protection circuits in the active-matrix shown in FIG. 1.
Figure 8:
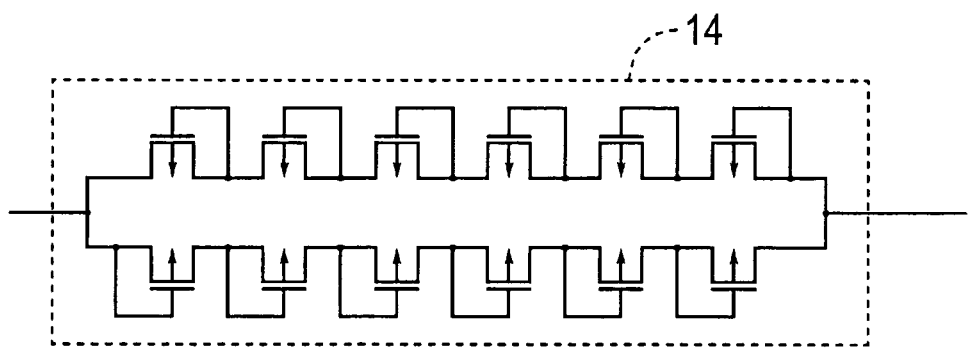
FIG. 8 is an equivalent circuit diagram of a diode ring constituting the electrostatic protection circuit shown in FIG. 7.
Figure 8:

FIG. 7 is a block diagram showing an example of a connection of an antistatic conductive layer, external-connection terminals, and electrostatic protection circuits in the active-matrix substrate according to the present embodiment. FIG. 8 is an equivalent circuit diagram of a diode ring constituting the electrostatic protection circuit shown in FIG. 7.

In FIG. 6, external-connection electrodes 13 (pads) that drive or inspect each pixel section 81 are formed of a conductive layer such as an ITO film and an aluminum layer. These external-connection terminals 13 are also exposed at the surface of the large substrate 200 due to their functions. Therefore, when high-voltage static electricity caused by the rubbing process for the large substrate 200 is applied, potential differences occur between external-connection terminals 13 or between an external-connection terminal 13 and the common wiring 48. Consequently, an external-connection terminal 13 may be destroyed by discharging caused by the potential differences.

Therefore, in the present embodiment, the external-connection terminals 13 are connected to the common wiring 48 through a prescribed circuit as described below. More specifically, as shown in FIG. 7, between external-connection terminals 13, and between each external-connection terminal 13 and the common wiring 48, electrostatic protection circuits 14 are formed. As the electrostatic protection circuits 14, diode rings, each having two sets of diode chains disposed in reverse to each other, are used in the present embodiment as shown in FIG. 8.

This electrostatic protection circuit 14 (diode ring) has bidirectional diode chains in which a plurality of (six pieces on one side in an example shown in FIG. 8) gate-and-drain-coupled, what is called diode-connection, TFTs are connected in series. In this electrostatic protection circuit 14, when a voltage applied to one terminal becomes higher than that applied to the other terminal by the dielectric strength of the diode chain, a current flows from the higher-voltage terminal to the lower-voltage terminal. With this principle, static electricity is released.

With this circuit, when potential differences between external-connection terminals 13 and between an external-connection terminal 13 and the common wiring 48 exceeds the dielectric strengths of the electrostatic protection circuits 14 (diode rings), currents flow to keep the potential differences constant. Therefore, the external-connection terminals 13 are prevented from being electrostatically destroyed during discharging or for some other reason.

(Other countermeasures against static electricity) When high-resistance resistive members using a poly-silicon film or the like are used to connect external-connection terminals 13 and the common wiring 48 to each external-connection terminal 13, instead of the diode rings, as the electrostatic protection circuits 14, the same advantage is obtained. In this case, the resistances are determined so as not to generate crosstalk between signals input to the respective terminals.

When external-connection terminals electrically connected to the data-line driving circuit 60 and those electrically connected to the scanning-line driving circuits 70 are arranged in a mixed manner as the external-connection terminals 13, and these external-connection terminals or the external-connection terminals and the common wiring 48 are connected through the electrostatic protection circuits 14, a potential difference is prevented from being generated in the data-line driving circuit 60 or in the scanning-line driving circuits 70. Therefore, a potential is positively prevented from being generated in an imbalanced manner only at the data-line driving circuit 60 or at the scanning-line driving circuits 70.

When the electrostatic protection circuits 14 using the diode rings or an equivalent circuit are formed on the large substrate 200, if the channel lengths L1 of the diodes (diode-connection TFTS) connecting the external-connection terminals 13 to the common wiring 48 and the channel lengths L2 of the diodes (diode-connection TFTs) connecting the external-connection terminals 13 are set longer than the channel lengths L4 of the TFTs constituting the data-line driving circuit 60 and the scanning-line driving circuits 70, the deterioration of the TFTs in the protection circuits is delayed. Therefore, it is expected that the life of an active-matrix electro-optical device is extended.

It is known that a poly-silicon TFT made in the low-temperature process has an extremely low dielectric strength when the channel length is short. As actual examples, it was confirmed in some cases that a TFT having a channel length of 6 $\mu$m passed a DC stress test with Vg and Vd being set to 15 V, but a TFT having a channel length of 4 $\mu$m was instantly destroyed under the same conditions. Such a phenomenon is also observed for a TFT made in the high-temperature process, but the low-temperature process shows a much higher possibility. Therefore, it is preferred that the TFTs used in the electrostatic protection circuits and the diode rings, which cause no effect on a usual operation, have long channels to increase the dielectric strengths thereof, and the TFTs used for the driving circuits (the data-line driving circuit 60 and the scanning-line driving circuits 70), which are protected by the electrostatic protection circuits, have short channels to give priority to the performance (such as on-current and operating frequency).

Figure 9A:
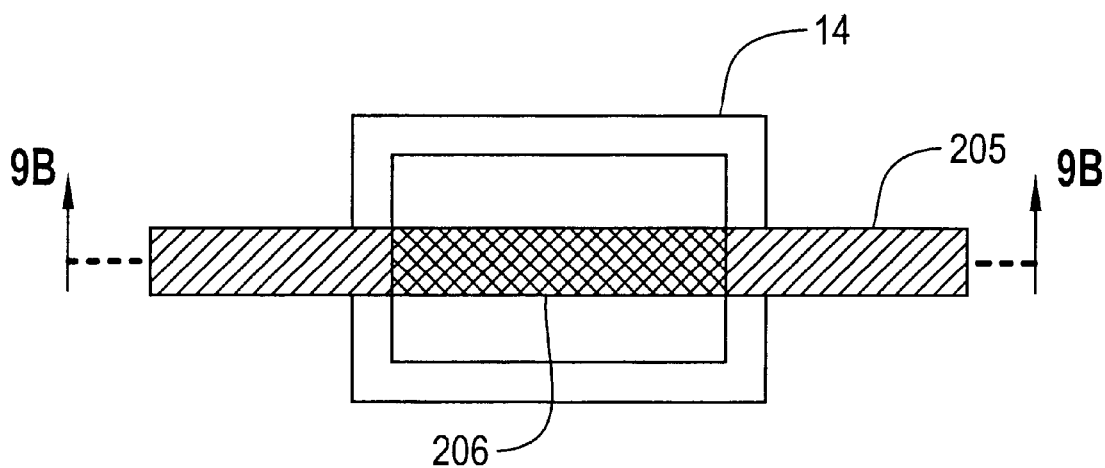
FIGS. 9(*a*) and (*b*) are a plan view and a cross-sectional view, respectively, showing a condition in which a diode ring constituting an electrostatic protection circuit is connected by a short-circuiting pattern.
Figure 9B:
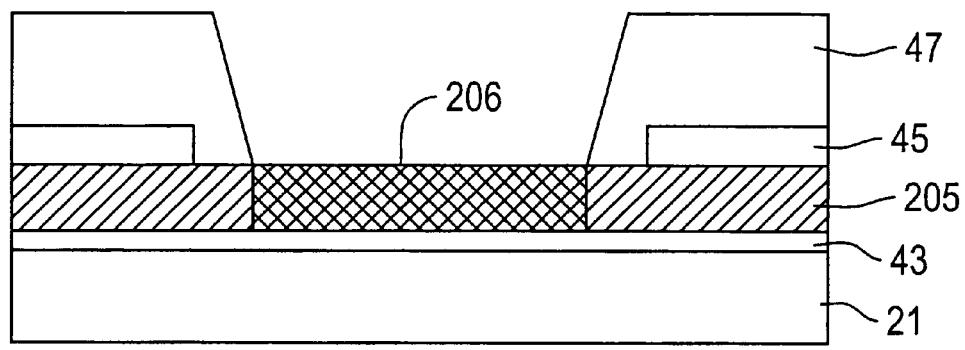

To manufacture the active-matrix substrates 2, a method is widely employed in which each element is made in a condition in which elements are connected with short-circuiting patterns (short-circuiting bars), and the elements are cut from the short-circuiting patterns in the final process in order to prevent electrostatic destruction from occurring in a process for forming semiconductor devices such as TFTs on the insulating substrate 21. Therefore, also in the present embodiment, in manufacturing the active-matrix substrate 2, both diode rings formed between adjacent external-connection terminals 13, and diode rings formed between each external-connection terminal 13 and the common wiring 48 disposed in a close vicinity, are connected by short-circuiting patterns 205, as shown in FIGS. 9(a) and (b), until an intermediate process, so as not to impair the function of the diode rings in the rubbing process due to the destruction of the diode rings constituting the electrostatic protection circuits 14 during the process. Therefore, until other active-element sections, passive-element sections and electrode sections are cut from short-circuiting patterns, the diode rings constituting the electrostatic protection circuits 14 are also connected with the short-circuiting patterns 205. Therefore, the external-connection terminals 13 (not shown) remain connected to each other by the short-circuiting patterns 205.

Cutting off of the short-circuiting patterns 205 for the diode rings constituting the electrostatic protection circuits 14, namely, cutting bridge sections 206 (that is, portions crossing over the diode rings) of the short-circuiting patterns 205 is performed at the final stage in the semiconductor process for the active-matrix substrate 2, at the same time when the other active-element sections, passive-element sections, and electrode sections are cut from the short-circuiting patterns by etching. This is performed for the rubbing process to be performed later. With this, the function of the diode rings is positively prevented from being impaired even when plasma damage is caused by plasma etching or plasma CVD used, for example, when semiconductor devices such as TFTs are formed. Therefore, the rate of occurrence of impaired operation of the diode rings constituting the electrostatic protection circuit 14 is greatly reduced, and electrostatic destruction of the external-connection terminals 13 is more effectively prevented. Consequently, the life of a liquid-crystal panel employing an active-matrix substrate 2 cut from the large substrate 200 is extended.

Figure 10A:
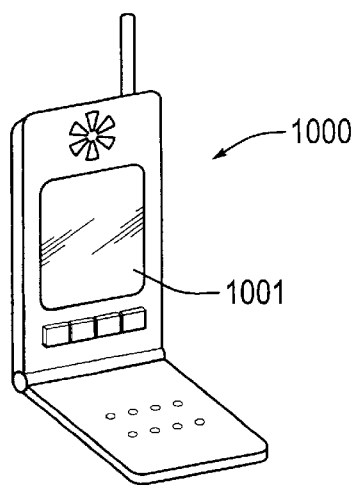
FIGS. 10(*a*), (*b*), and (*c*) are views showing examples of electronic equipment.
Figure 10B:
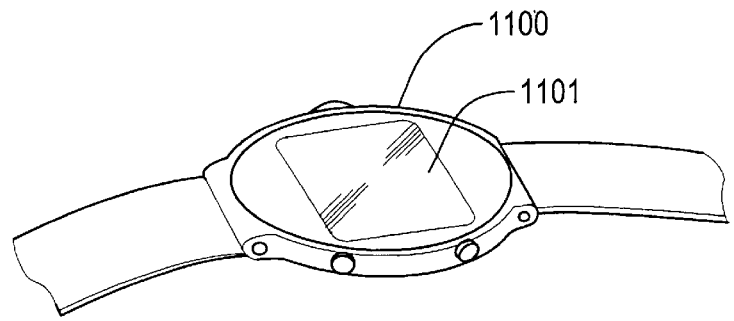
Figure 10C:
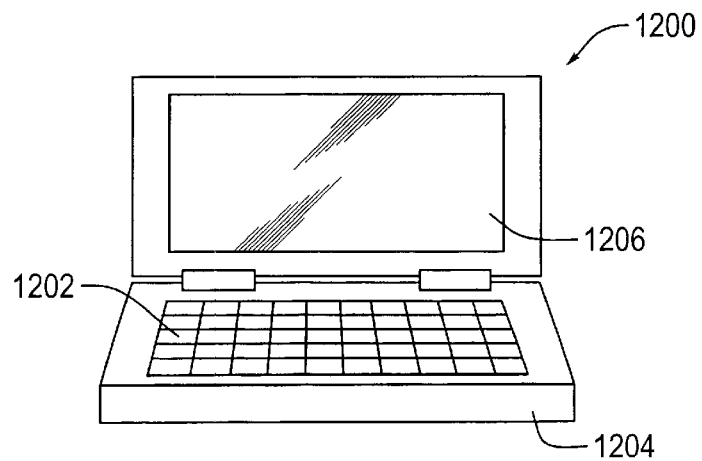

FIGS. 10(a)–10(c) are is perspective views showing examples of electronic equipment in which a liquid-crystal device of the present invention is used as a display device. In these electronic equipment, a structure may be used in which one pair of polarizers sandwich one pair of substrates, or in which only one polarizer is disposed.

Equipment having a structure in which only one polarizer is disposed is used for a reflective liquid-crystal device. When pixel electrodes are made from aluminum, a reflective liquid-crystal device can be formed. In this case, uneven pixel electrodes are formed. With such processing being applied to the pixel electrodes, image reflection is prevented. Between one polarizer and a substrate, a retardation plate that compensates for the viewing angle and a diffusing plate that prevents image reflection can be formed. Some retardation plates are used for color compensation. Retardation plates having different uses can be laminated.

FIG. 10(a) is a perspective view of a portable phone. A portable phone body 1000 includes a display section 1001 using a liquid-crystal device of the present invention.

FIG. 10(b) is a view showing a watch-type electronic equipment. The perspective view shows a watch body 1100. There is shown a display section 1101 using a liquid-crystal device of the present invention. Since this liquid-crystal device has high-resolution pixels, as compared with a conventional time indication section, a TV image can also be displayed to implement a watch-type TV set.

FIG. 10(c) is a view showing a portable information processing device such as a wordprocessor or a personal computer. An information processing device 1200 is formed of an input section 1202 such as a keyboard, a display section 1206 using a liquid-crystal device of the present invention, and an information processing device body 1204.

Figure 11:
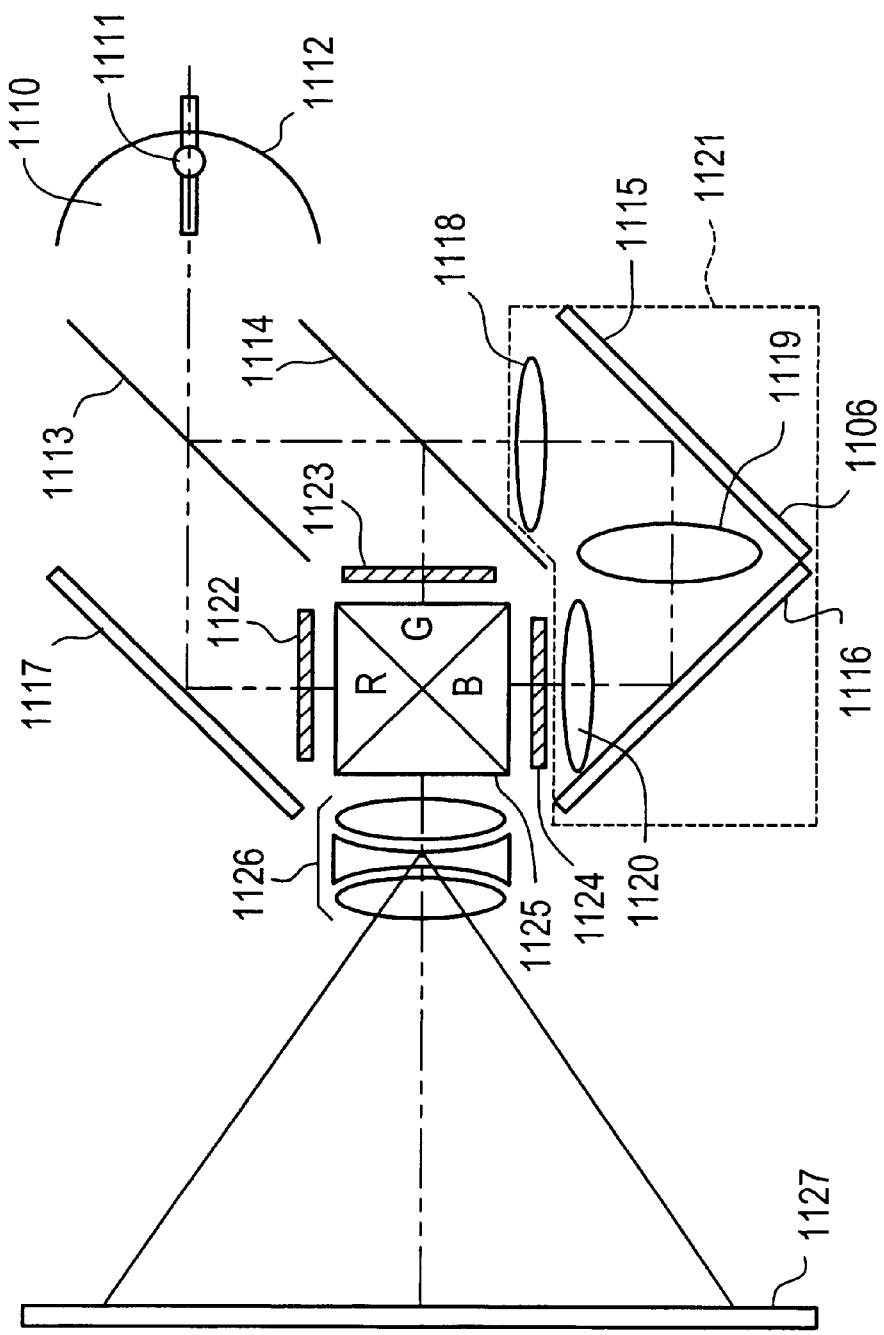
FIG. 11 is a view showing a structure in which an electro-optical device is mounted as a light valve in an example of an electric equipment.

FIG. 11 is a schematic structural view showing a main section of a projection display device. In the figure, there is shown a light source 1110, dichroic mirrors 1113 and 1114, reflecting mirrors 1115, 1116, and 1117, relay lenses 1118, 1119, and 1120, liquid-crystal light valves 1122, 1123, and 1124, a cross dichroic prism 1125, and a projection lens 1126. The light source 1110 is formed of a lamp 1111 such as a metal halide lamp, and a reflector 1112 that reflects the light of the lamp. The blue-and-green-light-reflective dichroic mirror 1113 transmits red light among white light flux sent from the light source 1110, and reflects blue light and green light. The transmitted red light is reflected from the reflecting mirror 1117 and is incident on the red-light liquid-crystal light valve 1122. On the other hand, among color light reflected from the dichroic mirror 1113, green light is reflected from the green-light-reflective dichroic mirror 1114 and is incident on the green-light liquid-crystal light valve 1123. On the other hand, blue light also passes through the second dichroic mirror 1114. To prevent blue light loss caused by a long optical path, light guide means 1121 formed of a relay lens system including the incident lens 1118, the relay lens 1119, and the outgoing lens 1120 is provided. Blue light is incident on the blue-light liquid-crystal light valve 1124 through this device. Three color lights modulated by the respective light valves are incident on a cross dichroic prism 1125. This prism is formed of four right-angled prisms cemented together, and a dielectric multi-layer film that reflects red light and a dielectric multi-layer film that reflects blue light are formed in the inside planes thereof in a cross-hair manner. The three color lights are synthesized by these dielectric multi-layer films to form light indicating a color image. The synthesized light is projected onto a screen 1127 by the projection lens 1126 serving as a projection optical system, and the image is enlarged and displayed.

INDUSTRIAL APPLICABILITY

As described above, since the antistatic conductive layer is formed in the areas excluding the pixel section in an active-matrix substrate according to the present invention, static electricity, generated when a rubbing process is applied to a polyimide film to change it to an alignment layer, is accumulated in the antistatic conductive layer and dispersed. Therefore, the substrate itself is prevented from being charged. Consequently, active elements and other elements formed in the peripheral circuits and other circuits are prevented from being electrostatically destroyed during discharging. Therefore, TFTs formed in a low-temperature process, which are not immune to static electricity, can be used as active elements. In addition, since the conductive layer serves as a large-capacitance bypass capacitor ("pass cap") when an electro-optical device is operated, it contributes to provide lower noise and lower EMI. Therefore, higher image quality and higher resolution are implemented in the electro-optical device.

What is claimed is:

1. An active-matrix substrate assembly, comprising:
    an active-matrix substrate having a pixel section;
    the pixel section including a pixel electrode and a switching element connected to the pixel electrode, the pixel section being provided on the active-matrix substrate;
    a peripheral circuit disposed around the pixel section that controls the switching element;
    an external-connection terminal electrically connected to the peripheral circuit; and
    an antistatic conductive layer formed at least a part of the active-matrix substrate other than the pixel section,
        the active-matrix substrate having an upper layer side of a no-wiring section where wiring is not formed, the antistatic conductive layer being formed at the active-matrix substrate at the upper layer side of the no-wiring section where wiring is not formed, at the part of the active-matrix substrate other than the pixel region.

2. The active-matrix substrate assembly according to claim 1, the active-matrix substrate having an upper layer side of an area where wiring to which a DC voltage is applied when an image is displayed is formed, the antistatic conductive layer being formed at the active-matrix substrate only at the upper layer side of the area where wiring to which a DC voltage is applied when an image is displayed is formed, at the part of the active-matrix substrate other than the pixel region.

3. The active-matrix substrate assembly according to claim 1, the antistatic conductive layer being formed so as to be exposed on a surface of the active-matrix substrate.

4. The active-matrix substrate assembly according to claim 1, the antistatic conductive layer being formed at least at an outer peripheral edge of the active-matrix substrate.

5. The active-matrix substrate assembly according to claim 1, further including another external-connection terminal and an electrostatic protection circuit in which two sets of diode chains are disposed in reverse directions relative to each other, the electrostatic protection circuit being formed between the external-connection terminals.

6. The active-matrix substrate assembly according to claim 1, further including another external-connection terminal and an electrostatic protection circuit, each of the external-connection terminals and the antistatic conductive layer being connected via the electrostatic protection circuit, the electrostatic protection circuit having two sets of diode chains disposed in reverse directions relative to each other.

7. The active-matrix substrate assemble according to claim 1, the antistatic conductive layer being made from the same material as at least one of the pixel electrode and the external-connection terminal.

8. The active-matrix substrate assembly according to claim 7, the antistatic conductive layer being made from at least one of Al, Ti, Ta, Cr, and an alloy of Al, Ti. Ta. and Cr.

9. The active-matrix substrate assembly according to claim 7, the antistatic conductive layer being formed of a transparent conductive film.

10. The active-matrix substrate assembly according to claim 9, the transparent conductive film being made from an indium tin oxide film.

11. An electro-optical device that includes the active-matrix substrate assembly of claim 1, comprising:
    an opposing substrate opposing the active-matrix substrate so as to define a prescribed gap;
    an electro-optical material sealed in the gap between the opposing substrate and the active-matrix substrate.

12. A method for manufacturing the active-matrix substrate assemble of claim 1, comprising the steps of:
    forming, after the pixel section, the peripheral circuit, the terminal section, and the antistatic conductive layer in each of a plurality of panel areas;
    cutting each of the plurality of panel areas from a large substrate as the active-matrix substrate, the plurality of panel areas being cut from the large substrate to make a plurality of active-matrix substrates.

13. The method for manufacturing the active-matrix substrate according to claim 12, the antistatic conductive layer by formed so as to cross over a boundary of adjacent panel areas.

14. An electronic equipment that includes the electro-optical device of claim 11, the electro-optical device being mounted as a display device.

15. An electronic equipment that includes the electro-optical device of claim 12, the electro-optical device being mounted as a light valve.

16. An active-matrix substrate assembly, comprising:
an active-matrix substrate having a pixel section;
the pixel section including a pixel electrode and a switching element connected to the pixel electrode, the pixel section being provided on the active-matrix substrate;
a peripheral circuit disposed around the pixel section that controls the switching element;
an external-connection terminal electrically connected to the peripheral circuit; and
an antistatic conductive layer formed at at least a part of the active-matrix substrate other than the pixel section, the active-matrix substrate further including another external-connection terminal and an electrostatic protection circuit in which two sets of diode chains are disposed in reverse directions relative to each other, the electrostatic protection circuit being formed between the external-connection terminals, the switching element and the peripheral circuit being formed of thin-film transistors, and the diode chains of the electrostatic protection circuit including diode-connection thin-film transistors, channel lengths of the diode-connection thin-film transistors being longer than channel lengths of the thin-film transistor connected to the pixel electrode and the thin-film transistors formed in the peripheral circuit.

17. An active-matrix substrate assembly, comprising:
an active-matrix substrate having a pixel section;
the pixel section including a pixel electrode and a switching element connected to the pixel electrode, the pixel section being provided on the active-matrix substrate;
a peripheral circuit disposed around the pixel section that controls the switching element;
an external-connection terminal electrically connected to the peripheral circuit;
an antistatic conductive layer formed at at least a part of the active-matrix substrate other than the pixel section; and
another external-connection terminal and an electrostatic protection circuit in which two sets of diode chains are disposed in reverse directions relative to each other, the electrostatic protection circuit being formed between the external-connection terminals, the switching element and the peripheral circuit being formed of thin-film transistors, and the diode chains of the electrostatic protection circuit including diode-connection thin-film transistors, channel lengths of the diode-connection thin-film transistors being longer than channel lengths of the thin-film transistor connected to the pixel electrode and the thin-film transistors formed in the peripheral circuit, the active-matrix substrate assembly further including a scanning line and a data line, the thin-film transistors being connected to the scanning line and the data line;
the peripheral circuit including a data-line driving circuit that outputs at least an image signal, to be applied to the pixel electrode through the thin-film transistor, to the data line, and a scanning line driving circuit that outputs a scanning line to control selection/non-selection states of the thin-film transistors to the scanning line; and
further including another external-connection terminal, such that the external-connection terminals using diode connection include an external-connection terminal electrically connected to the data-line driving circuit and an external-connection terminal electrically-connected to the scanning-line driving circuit.

18. An active-matrix substrate assembly, comprising:
an active-matrix substrate having a pixel section;
the pixel section including a pixel electrode and a switching element connected to the pixel electrode, the pixel section being provided on the active-matrix substrate;
a peripheral circuit disposed around the pixel section that controls the switching element;
an external-connection terminal electrically connected to the peripheral circuit; and
an antistatic conductive layer formed at at least a part of the active-matrix substrate other than the pixel section, the active-matrix substrate further including another external-connection terminal and an electrostatic protection circuit in which two sets of diode chains are disposed in reverse directions relative to each other, the electrostatic protection circuit being formed between the external-connection terminals, the switching element and the peripheral circuit being formed of thin-film transistors, and the diode chains of the electrostatic protection circuit including diode-connection thin-film transistors, channel lengths of the diode-connection thin-film transistors being longer than channel lengths of the thin-film transistor connected to the pixel electrode and the thin-film transistors formed in the peripheral circuit;
the thin-film transistors having active areas, the active areas of the thin-film transistors being formed of a poly-silicon film.

19. An active-matrix substrate assembly, comprising:
an active-matrix substrate having a pixel section;
the pixel section including a pixel electrode and a switching element connected to the pixel electrode, the pixel section being provided on the active-matrix substrate;
a peripheral circuit disposed around the pixel section that controls the switching element;
an external-connection terminal electrically connected to the peripheral circuit; and
an antistatic conductive layer formed at at least a part of the active-matrix substrate other than the pixel section; and
another external-connection terminal and an electrostatic protection circuit, each of the external-connection terminals and the antistatic conductive layer being connected via the electrostatic protection circuit, the electrostatic protection circuit having two sets of diode chains disposed in reverse directions relative to each other;
the switching element and the peripheral circuit being formed of thin-film transistors, and the diode chains of the electrostatic protection circuit including diode-connection thin-film transistors, channel lengths of the diode-connection thin-film transistors being longer than channel lengths of the thin-film transistor connected to the pixel electrode and the thin-film transistors formed in the peripheral circuit.

20. An active-matrix substrate assembly, comprising:

an active-matrix substrate having a pixel section;

the pixel section including a pixel electrode and a switching element connected to the pixel electrode, the pixel section being provided on the active-matrix substrate;

a peripheral circuit disposed around the pixel section that controls the switching element;

an external-connection terminal electrically connected to the peripheral circuit; and an antistatic conductive layer formed at at least a part of the active-matrix substrate other than the pixel section; and another external-connection terminal and an electrostatic protection circuit, each of the external-connection terminals and the antistatic conductive layer being connected via the electrostatic protection circuit, the electrostatic protection circuit having two sets of diode chains disposed in reverse directions relative to each other;

the switching element and the peripheral circuit being formed of thin-film transistors, and the diode chains of the electrostatic protection circuit including diode-connection thin-film transistors, channel lengths of the diode-connection thin-film transistors being longer than channel lengths of the thin-film transistor connected to the pixel electrode and the thin-film transistors formed in the peripheral circuit, further including a scanning line and a data line, the thin-film transistors being connected to the scanning line and the data line;

the peripheral circuit including a data-line driving circuit that outputs at least an image signal, to be applied to the pixel electrode through the thin-film transistor, to the data line, and a scanning line driving circuit that outputs a scanning line to control selection/non-selection states of the thin-film transistors to the scanning line; and further including another external-connection terminal, such that the external-connection terminals using diode connection include an external-connection terminal electrically connected to the data-line driving circuit and an external-connection terminal electrically connected to the scanning-line driving circuit.

21. A method of manufacturing an active-matrix substrate assembly, comprising the steps of:

forming an active-matrix substrate having a pixel section;

providing the pixel section, that includes a pixel electrode and a switching element connected to the pixel electrode, on the active-matrix substrate at the pixel section;

disposing a peripheral circuit around the pixel section, the peripheral circuit controlling the switching element;

electrically connecting an external-connection terminal to the peripheral circuit;

forming an antistatic conductive layer at at least a part of the active-matrix substrate other than the pixel section, the active-matrix substrate having an upper layer side of an area where a plurality of wirings to which a DC voltage is applied are formed the antistatic conductive layer being formed as a common wiring at the active-matrix substrate at the upper layer side of the area where a plurality of wirings to which DC voltages are applied are formed, at the part of the active-matrix substrate other than the pixel region.

22. An active-matrix substrate assembly, comprising:

an active-matrix substrate having a pixel section;

the pixel section including a pixel electrode and a switching element connected to the pixel electrode, the pixel section being provided on the active-matrix substrate;

a peripheral circuit disposed around the pixel section that controls the switching element;

an external-connection terminal electrically connected to the peripheral circuit and an antistatic conductive layer formed at at least a part of the active-matrix substrate other than the pixel section, the external-connection terminal being connected to the antistatic conductive layer via an electrostatic protection circuit including thin-film transistors, channel lengths of the thin-film transistors of the electrostatic protection circuit being longer than channel lengths of the thin-film transistor connected to the pixel electrode.

23. An active-matrix substrate assembly, comprising:

an active-matrix substrate having a pixel section;

the pixel section including a pixel electrode and a switching element connected to the pixel electrode, the pixel section being provided on the active-matrix substrate;

a peripheral circuit disposed around the pixel section that controls the switching element;

an external-connection terminal electrically connected to the peripheral circuit and an antistatic conductive layer formed at at least a part of the active-matrix substrate other than the pixel section, the external-connection terminal being connected to the antistatic conductive layer via an electrostatic protection circuit including thin-film transistors, channel lengths of the thin film transistors of the electrostatic protection circuit being longer than channel lengths of the thin-film transistor formed in the peripheral circuit.

24. An active-matrix substrate assembly, comprising:

an active-matrix substrate having a pixel section;

the pixel section including a pixel electrode and a switching element connected to the pixel electrode, the pixel section being provided on the active-matrix substrate;

a peripheral circuit disposed around the pixel section that controls the switching element;

an external-connection terminal electrically connected to the peripheral circuit and an antistatic conductive layer formed at at least a part of the active-matrix substrate other than the pixel section, the active-matrix substrate having an upper layer side of an area where a plurality of wirings to which a DC voltage is applied are formed, the antistatic conductive layer being formed as a common wiring at the active-matrix substrate at the upper layer side of the area where a plurality of wirings to which DC voltages are applied are formed, at the part of the active-matrix substrate other than the pixel region.

* * * * *